US010661842B2

(12) United States Patent
Povinelli et al.

(10) Patent No.: US 10,661,842 B2
(45) Date of Patent: May 26, 2020

(54) MODULAR TAILGATE

(71) Applicants: Anthony J. Povinelli, Romeo, MI (US); Martin R. Matthews, Troy, MI (US); Mark P. Birka, Northville, MI (US); Michael A. West, Howell, MI (US); Magna Exteriors Inc., Concord (CA)

(72) Inventors: Anthony J. Povinelli, Romeo, MI (US); Martin R. Matthews, Troy, MI (US); Mark P. Birka, Northville, MI (US); Michael A. West, Howell, MI (US)

(73) Assignee: Magna Exteriors Inc., Aurora (CA)

( * ) Notice: Subject to any disclaimer, the term of this patent is extended or adjusted under 35 U.S.C. 154(b) by 310 days.

(21) Appl. No.: 15/505,215

(22) PCT Filed: Aug. 19, 2015

(86) PCT No.: PCT/US2015/045877
§ 371 (c)(1),
(2) Date: Feb. 20, 2017

(87) PCT Pub. No.: WO2016/028884
PCT Pub. Date: Feb. 25, 2016

(65) Prior Publication Data
US 2017/0274940 A1    Sep. 28, 2017

Related U.S. Application Data

(60) Provisional application No. 62/039,172, filed on Aug. 19, 2014.

(51) Int. Cl.
*B62D 33/027* (2006.01)
*B60R 3/02* (2006.01)
(Continued)

(52) U.S. Cl.
CPC ............ *B62D 33/0273* (2013.01); *B60P 1/26* (2013.01); *B60Q 1/2661* (2013.01); *B60R 3/02* (2013.01);
(Continued)

(58) Field of Classification Search
CPC ........ B62D 33/0273; B62D 33/03; B60R 3/02
(Continued)

(56) References Cited

U.S. PATENT DOCUMENTS

| 5,518,158 A | 5/1996 | Matlack |
| 6,199,930 B1 * | 3/2001 | Riley ............... B60R 11/06 |
| | | 224/404 |

(Continued)

FOREIGN PATENT DOCUMENTS

| EP | 1028016 A1 | 8/2000 |
| WO | 2008025340 A1 | 3/2008 |
| WO | 2013110123 A1 | 8/2013 |

OTHER PUBLICATIONS

International Search Report for International Application No. PCT/US2015/045877, dated Nov. 23, 2015.

*Primary Examiner* — Jason S Morrow
(74) *Attorney, Agent, or Firm* — Warn Partners, P.C.

(57) ABSTRACT

A modular gate combined with multiple functions which can be easily employed with existing tailgates without any hardware or mounting modifications to existing truck beds. There is provided a modular tailgate system having a tailgate portion in combination with a plurality of functions. The modular tailgate system integrates any combinations of at least two of the plurality of features without affecting existing body sides and/or existing truck beds. Integrated features include a multi-functional gate (e.g., swing, drop, etc), storage (e.g., normal, sealed, refrigerated, heated, etc), step(s), lighting (e.g., ingress/egress, bed interior, removable, trailer hitch, parking, etc), bed extension(s), power (e.g., 12 v and/or 110 v), tie downs (e.g., ratchets, anchors, etc), sawhorse, magnet(s), table(s), bench(es), seat(s), net(s), any other predetermined desired function, etc., and combinations thereof.

9 Claims, 12 Drawing Sheets

(51) Int. Cl.
 *B60P 1/26* (2006.01)
 *B60Q 1/26* (2006.01)
 *B60R 7/00* (2006.01)
 *B60R 11/00* (2006.01)
 *F21Y 115/10* (2016.01)
 *B60Q 1/30* (2006.01)

(52) U.S. Cl.
 CPC .............. *B60R 7/005* (2013.01); *B60R 11/00* (2013.01); *B60Q 1/2696* (2013.01); *B60Q 1/30* (2013.01); *B60R 2011/0021* (2013.01); *B60R 2011/0075* (2013.01); *F21Y 2115/10* (2016.08)

(58) Field of Classification Search
 USPC ........................................................ 296/62
 See application file for complete search history.

(56) References Cited

U.S. PATENT DOCUMENTS

| | | | | |
|---|---|---|---|---|
| 6,422,342 | B1 * | 7/2002 | Armstrong | B60R 3/02 |
| | | | | 182/127 |
| 7,201,424 | B1 | 4/2007 | Fournier | |
| 7,234,750 | B1 * | 6/2007 | Doolittle | B60R 3/02 |
| | | | | 296/57.1 |
| 7,261,357 | B1 * | 8/2007 | Bechen | B60R 3/02 |
| | | | | 296/57.1 |
| 9,623,803 | B1 * | 4/2017 | Martins | B60R 3/02 |
| 9,956,995 | B1 * | 5/2018 | Neighbors | B62D 33/037 |
| 2002/0070577 | A1 * | 6/2002 | Pool, III | B60R 3/02 |
| | | | | 296/62 |
| 2004/0113449 | A1 * | 6/2004 | Hunt | B60J 5/108 |
| | | | | 296/57.1 |
| 2012/0126564 | A1 * | 5/2012 | Hausler | B62D 33/0273 |
| | | | | 296/62 |
| 2012/0325877 | A1 | 12/2012 | Franks | |
| 2013/0110123 | A1 | 5/2013 | Foirella et al. | |
| 2015/0102624 | A1 * | 4/2015 | Kmita | B60R 9/06 |
| | | | | 296/37.6 |
| 2016/0075286 | A1 * | 3/2016 | Butlin, Jr. | B60R 3/02 |
| | | | | 296/62 |
| 2016/0121801 | A1 * | 5/2016 | Masih | B60R 9/06 |
| | | | | 296/37.6 |
| 2016/0311355 | A1 * | 10/2016 | Krajenke | B62D 33/0273 |
| 2017/0190302 | A1 * | 7/2017 | Kogut | B60R 11/06 |
| 2018/0065560 | A1 * | 3/2018 | Krishnan | B60R 3/02 |
| 2018/0195332 | A1 * | 7/2018 | Martins | E05F 5/06 |
| 2019/0054961 | A1 * | 2/2019 | Ngo | B60R 3/02 |

* cited by examiner

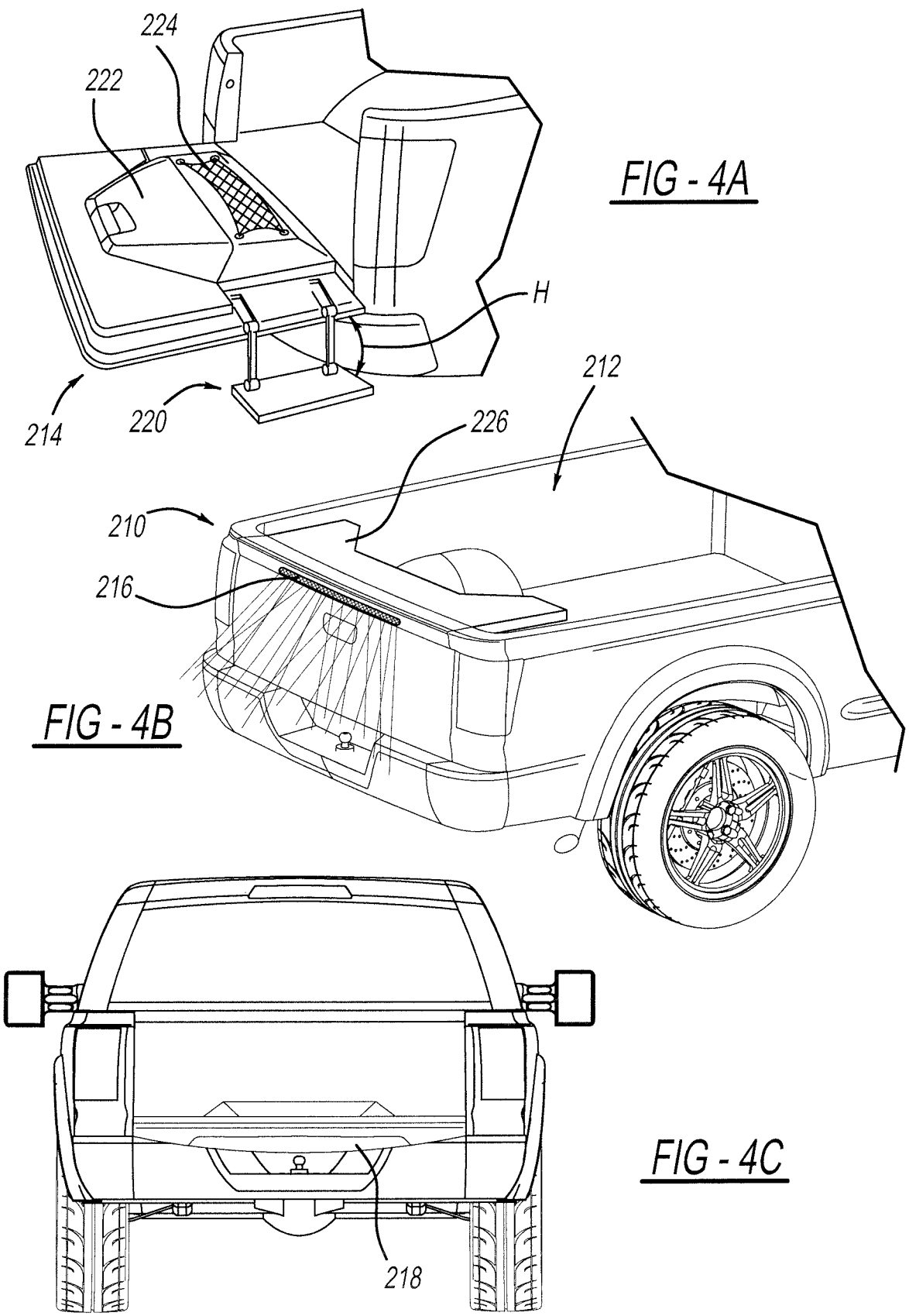

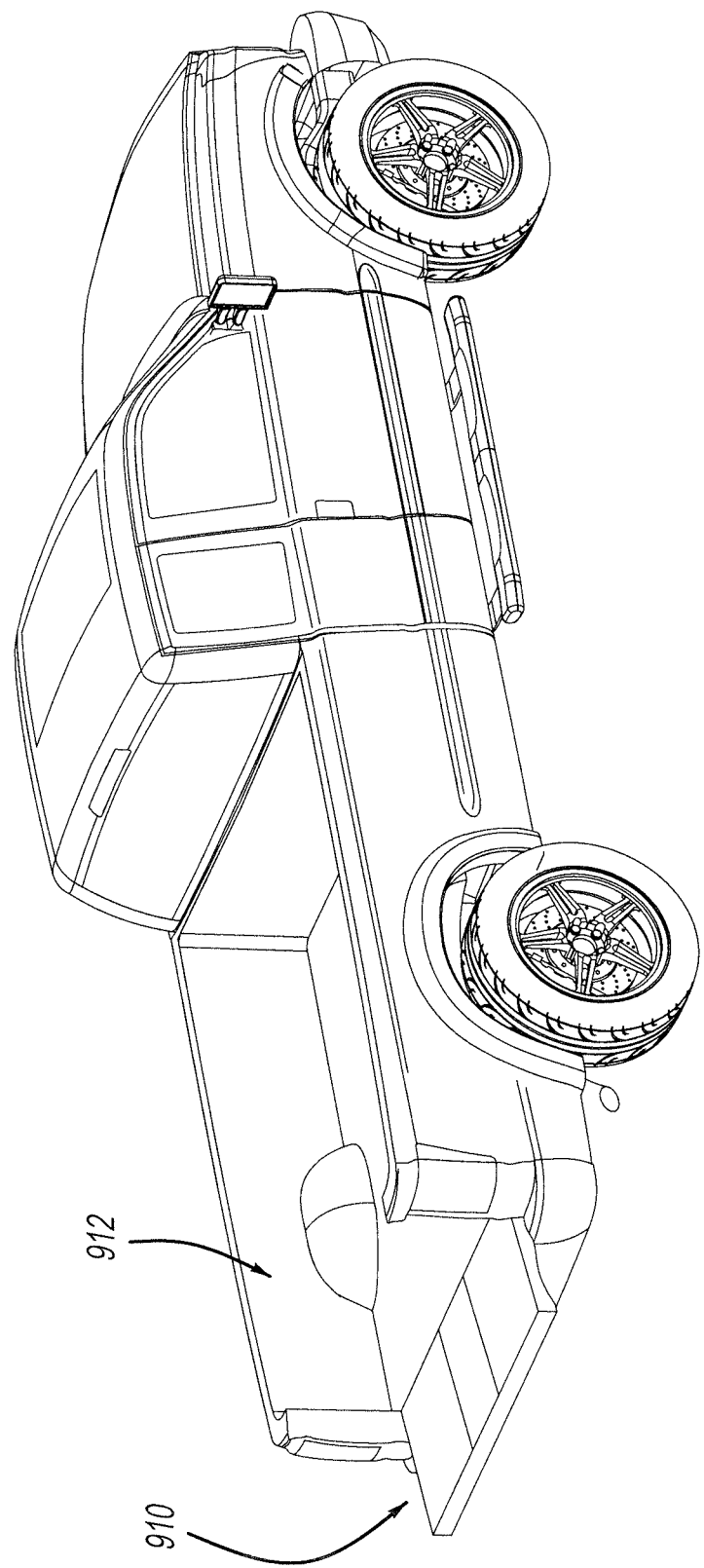

MODULAR TAILGATE

CROSS-REFERENCE TO RELATED APPLICATIONS

This application is a National Stage of International Application No. PCT/US2015/045877, filed Aug. 19, 2015, which claims the benefit of U.S. Provisional Patent Application No. 62/039,172, filed Aug. 19, 2014. The disclosures of the above applications are incorporated herein by reference.

FIELD OF THE INVENTION

The present invention relates to a tailgate with multiple features integrated.

BACKGROUND OF THE INVENTION

Pickup truck tailgates have little to no functionality. Generally, tailgates provide ingress/egress to the bed of the pickup truck for cargo load. Typically, tailgates provide little more. There are a few known tailgates that additionally provide a single feature such as lighting, storage, or tie downs. These individual features exist as stand alone items.

Accordingly, there exists a need for a modular tailgate with multiple features incorporated therewith for a number of applications to improve functionality and provide a plurality of multi-functional arrangements.

SUMMARY OF THE INVENTION

The present invention is directed to a modular tailgate system integrating combinations of a plurality of features without affecting current body sides. Integrated features include, but are not limited to, multi-functional gate (e.g., swing, drop, etc), storage (e.g., normal, sealed, refrigerated, heated, etc), step(s), lighting (e.g., ingress/egress, bed interior, removable, trailer hitch, parking, etc), bed extension(s), power source (e.g., 12 v and/or 110 v, outlet, strip), tie downs (e.g., ratchets, anchors, etc), sawhorse, magnet(s), table(s), bench(es), seat(s), net(s), any other predetermined desired feature, etc., and various combinations thereof of at least two features. There is provided a complete modular gate combined with multiple functions which is easily employable with existing tailgates without any hardware or mounting modifications to existing truck beds, e.g., pickup truck beds, sport utility vehicle (SUV) interior storage.

A modular liftgate, e.g., for an SUV, combined with any of the aforementioned multiple functions is also within the contemplation of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A-4C are schematic illustrations of a modular tailgate having a tailgate portion in combination with a plurality of features, in accordance with yet another embodiment of the present invention;

FIG. 13A is a perspective view of a pickup truck with a modular tailgate in an open position;

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-13D generally, there is provided a modular tailgate system having a tailgate portion in combination with a plurality of functions. The modular tailgate system integrates any combinations of at least two of the plurality of features without affecting existing body sides and/or existing truck beds. Integrated features include, but are not limited to, multi-functional gate (e.g., swing, drop, multi-positioning, etc), storage (e.g., normal, sealed, refrigerated, heated, etc), step(s), lighting (e.g., ingress/egress, bed interior, removable, trailer hitch, parking, etc), bed extension(s), bed access door(s), power (e.g., 12 v and/or 110 v), tie downs (e.g., ratchets, anchors, etc), sawhorse(s), magnet(s), table(s), bench(es), seat(s), net(s), stationary and deployable air diffuser(s), any other predetermined desired function, and/or combinations thereof.

Figure 1A:
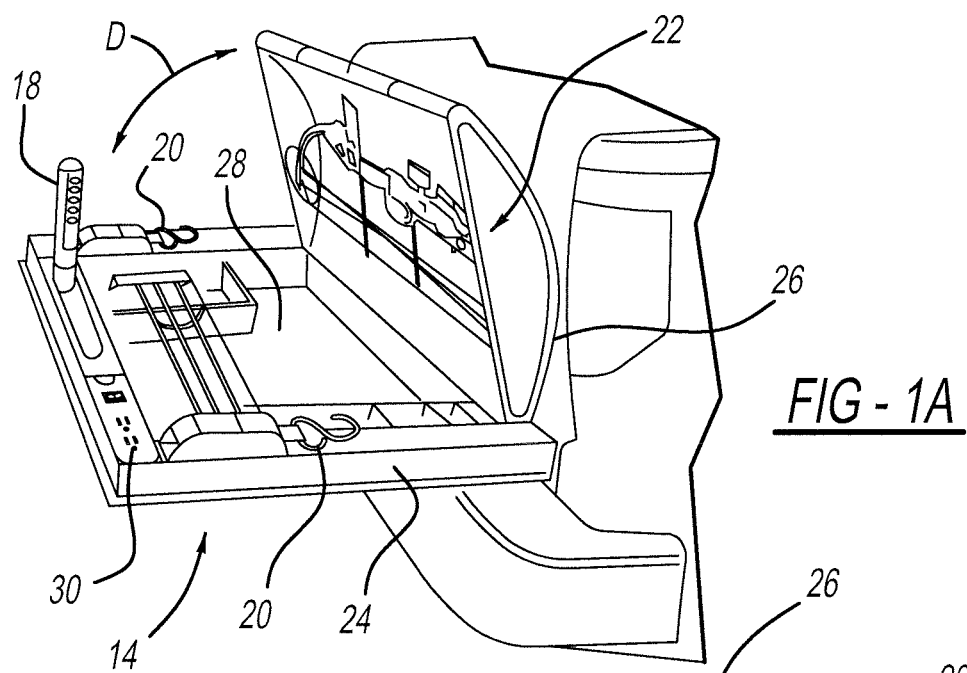
FIGS. 1A-B are schematic illustrations of a modular tailgate having a tailgate portion in combination with a plurality of features, in accordance with a first embodiment of the present invention.
Figure 1B:
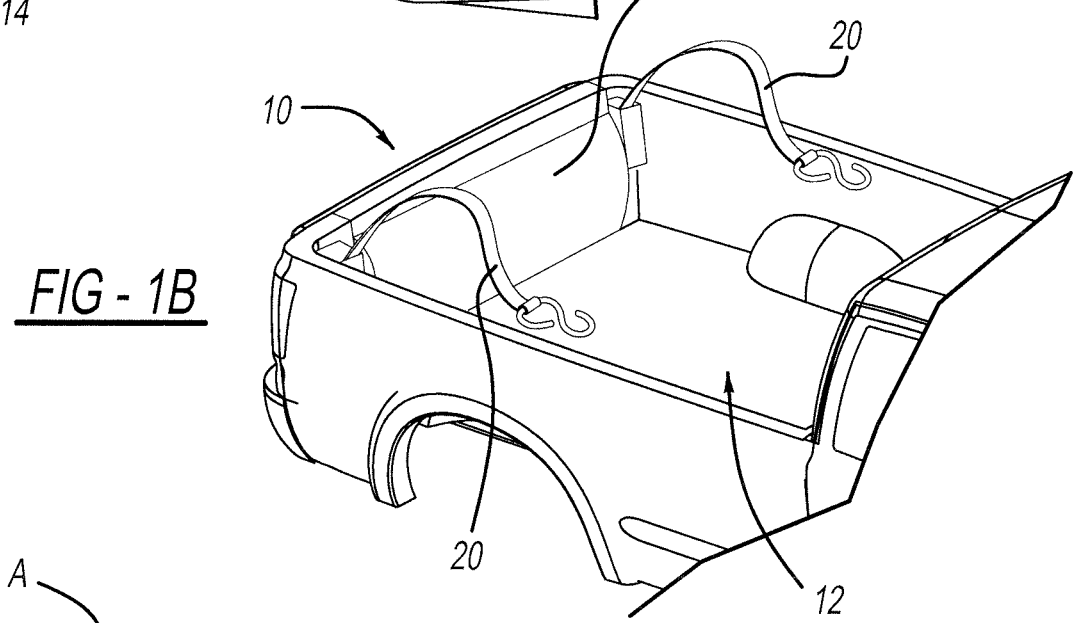
Figure 2:
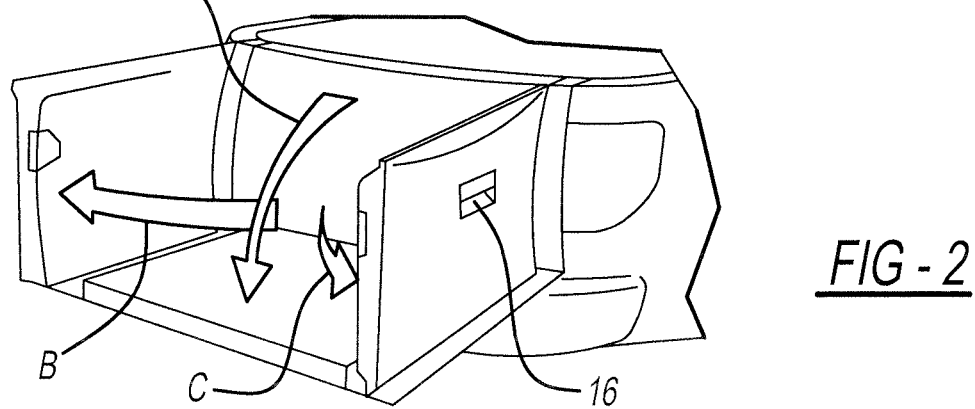
FIG. 2 is a rear perspective view of a modular tailgate having a tailgate portion including a three-way opening door according to an embodiment of the present invention.

FIGS. 1A-B are a schematic illustration of a modular tailgate system, shown generally at 10 operably connected to a pickup truck cargo bed shown generally at 12. The modular tailgate system 10 has a tailgate portion shown generally at 14 in combination with a plurality of features. The tailgate portion 14 selectively rotates between at least a stowed position (FIG. 1B) and deployed position (FIG. 1A). In one embodiment, as further illustrated in FIG. 2, the tailgate portion 14 selectively rotates between a stowed and deployed position, as indicated by arrows "A", to allow rear access to the cargo bed. Alternatively, as illustrated in FIG. 2 the tailgate portion 14 is a 3-way opening door that swings to the left and/or right and/or drops, as indicated by arrows "B" "C" and "A", respectfully, for access to the cargo bed. An ergonomic handle 16 is provided for selectively releasing the connection to the vehicle, e.g., an ergo handle for swing and/or drop of the tailgate portion 14.

Referring further to FIGS. 1A-2 generally, the plurality of features integrated with the tailgate portion include, but are not limited to, the 3-way opening door movable in direction A, B and/or C, at least one ergonomic handle 16 swing/drop, at least one lighting device 18 (e.g., removable, fixed, and/or pivotable LED lighting device), at least one integrated tie-down 20 (most preferably, at least two integrated tie-downs 20), which is, by way of example, a top (FIG. 1B) or bottom (FIG. 1A) mounted tie-down, and/or at least one storage unit shown generally at 22 (e.g., lock box and/or storage case, etc).

By way of non-limiting example, the storage unit 22 is a lock box integrated with the tailgate pivotable to the deployed position (FIG. 1A). The storage unit 22 has a base 24 and a pivotable lid 26 that opens e.g., by pivoting toward the vehicle bed as indicated by arrow "ID" to allow access to at least one internal storage compartment 28 in the base 24 and/or lid 26 of the storage unit 22. The storage unit 22 has at least one lighting device 18 enclosed therein, e.g., removable and/or rotatable, and at least one power source 30. The storage unit 22 preferably has a weather resistant seal.

It is understood that the modular tailgate system 10 has a tailgate portion 14 in combination with any of at least two predetermined desired plurality of features, including, more or less or alternatives to that shown in FIGS. 1A to 2.

Figure 3A:
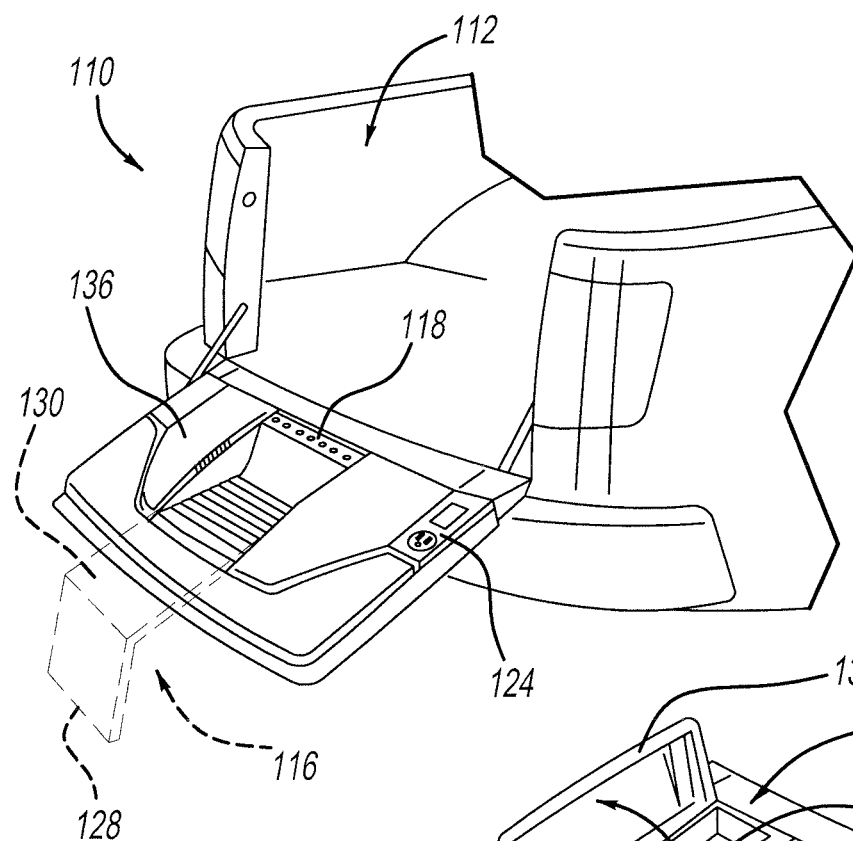
FIGS. 3A-3C are schematic illustrations of a modular tailgate having a tailgate portion in combination with a plurality of features, in accordance with another embodiment of the present invention.
Figure 3B:
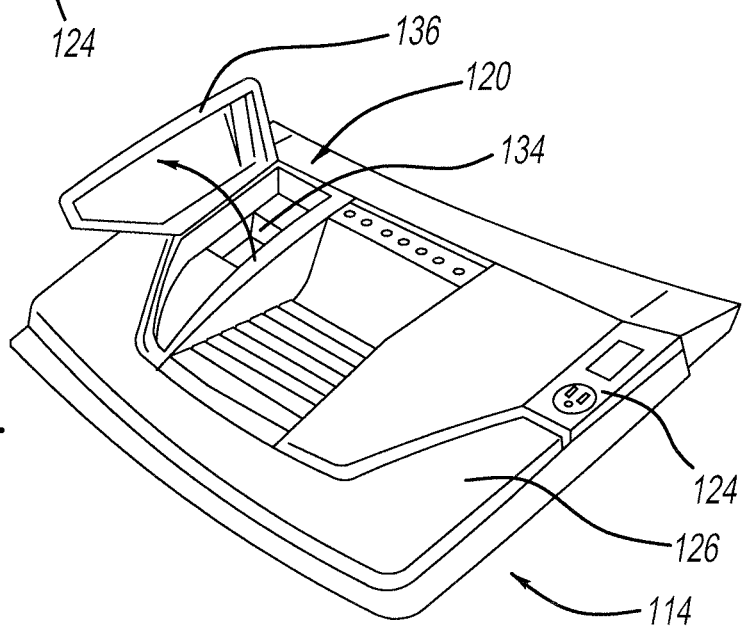
Figure 3C:
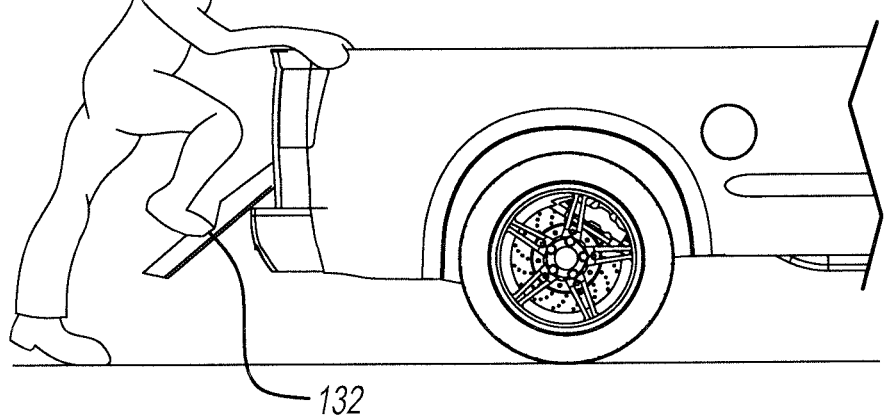

In accordance with another embodiment, FIGS. 3A-3C generally illustrate a modular tailgate system shown generally at 110 operably connected to a pickup truck cargo bed shown generally at 112. The modular tailgate system 110 has a tailgate portion indicated generally at 114 in combination with a plurality of features. The tailgate portion 114 selectively rotates between a stowed and deployed position, e.g., up/down, to allow rear access to the cargo bed. The plurality of features integrated with the tailgate portion include at least one integrated step shown generally at 116 that is operably extendable downward at a predetermined angle and distance operable to allow an optimal angle for an operator to step up onto the tailgate portion 114 and into the cargo bed 112 of the vehicle. The plurality of features further include at least one lighting device 118, e.g., LED light strip, at least one storage unit shown generally at 120 with at least one storage compartment 134 or "unit" and a lid 136, e.g., hinged lid, at least one power source 124, e.g., outlet, and at least one rear aerodynamic diffuser 126.

The rear diffuser 126 is operably selectively deployable for aerodynamics (e.g., See FIG. 4B).

The step 116 is moveable between at least a stowed position within a recess of the tailgate and deployed position for a step up into the cargo bed 112. It is understood that any suitable location for the step is contemplated. According to one embodiment, a lower depending step portion 128 is operably connected to an upper portion 130 at a predetermined angle, e.g., 45-90 degrees, to provide a suitable stepping surface on either portion 128,130 (e.g., FIG. 3A). It is contemplated that the connection can be hinged, fixed, and/or integrally formed. Alternatively, the step 116 has at least one operably shaped notch or stepping surface 132 (e.g., FIG. 3C). The step 116 opens and/or slides to an optimal step angle for the stepping surface 132. Gripping or non-skid surfaces on the step are contemplated.

It is understood that the modular tailgate system 110 has a tailgate portion 114 in combination with any of at least two predetermined desired plurality of features, including, more or less or alternatives to that shown in FIGS. 3A-3C.

In accordance with yet another embodiment, FIGS. 4A-4C are schematic illustrations of a modular tailgate system shown generally at 210 operably connected to a pickup truck cargo bed shown generally at 212. The modular tailgate system 210 has a tailgate portion shown generally at 214 in combination with a plurality of features. The tailgate portion 214 selectively rotates between a stowed (FIG. 4B) and deployed position (FIGS. 4A,C), e.g., up/down, to allow rear access to the cargo bed. The plurality of features integrated with the tailgate portion include at least one storage unit, at least one lighting device, at least one integrated step, and at least one rear diffuser coupled to the tailgate.

At least one lighting device 216 is provided that is a light emitting diode (LED) lighting strip, and at least one other lighting device 218, e.g., that is a cargo light auxiliary light (white).

The integrated step shown generally at 220 is preferably a fold-out step that operably moves between a stowed and a deployed position, as indicated by arrows "H" to allow an operator to step up onto the tailgate portion 214 and/or into the cargo bed 212 of the vehicle. Gripping or non-skid surfaces on the step are contemplated.

Further integrated into the tailgate portion 214 is at least one storage unit 222, at least one net 224, and at least one rear diffuser 226.

It is understood that the modular tailgate system 210 has a tailgate portion 214 in combination with any of at least two predetermined desired plurality of features, including, more or less or alternatives to that shown in FIGS. 4A-4C.

Figure 5A:
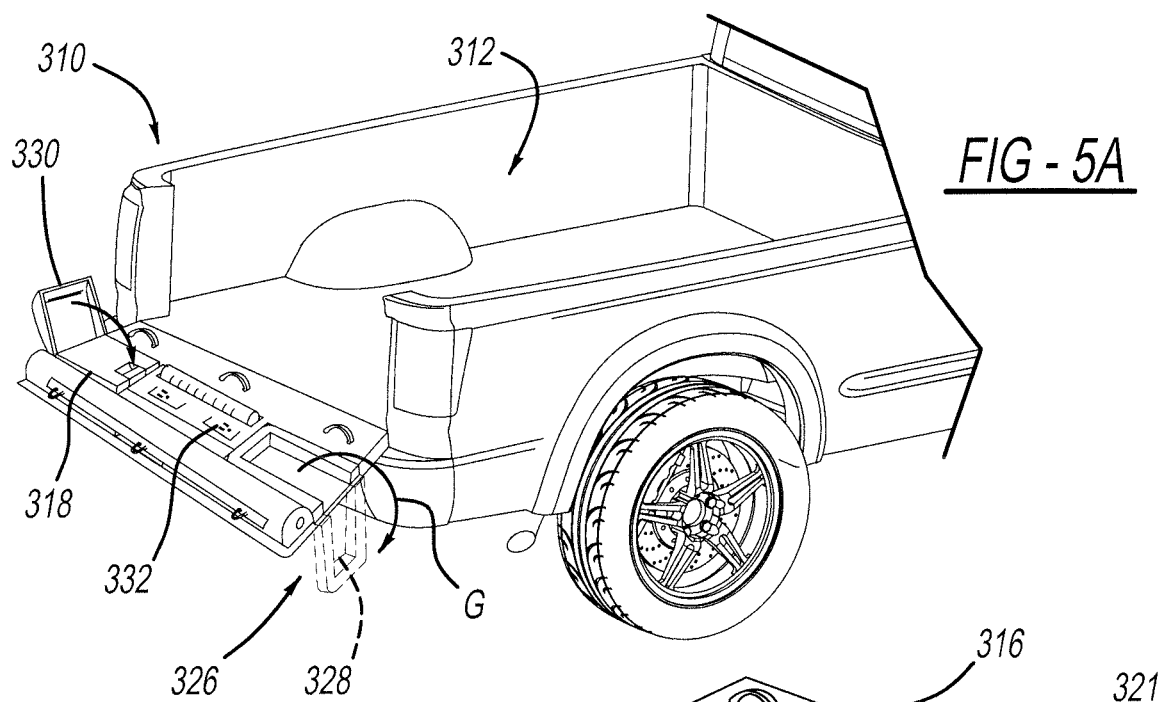
FIGS. 5A-5C are schematic illustrations of a modular tailgate having a tailgate portion in combination with a plurality of features, in accordance with an additional embodiment of the present invention.
Figure 5B:
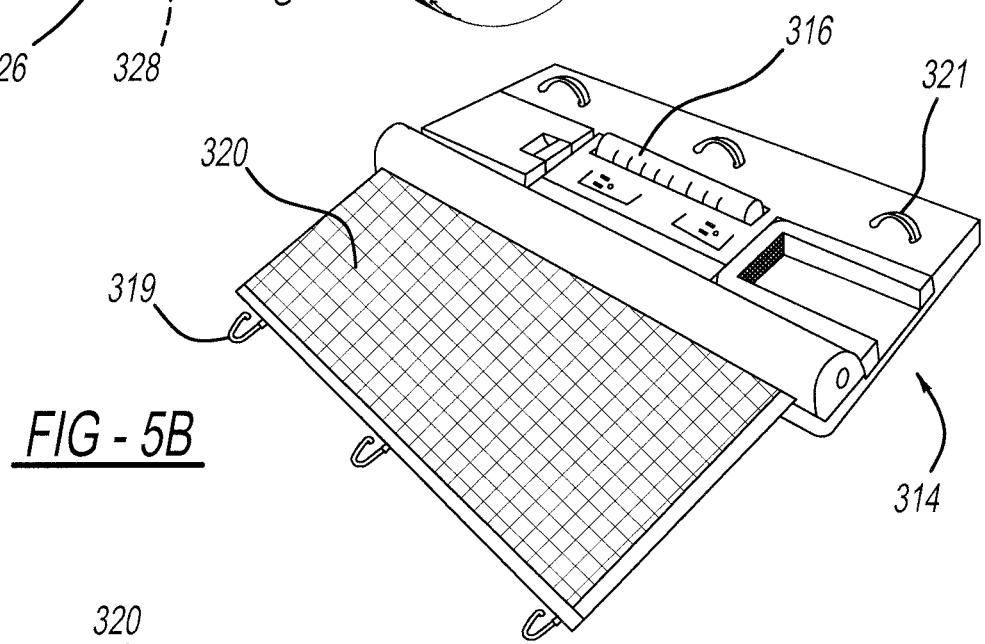
Figure 5C:
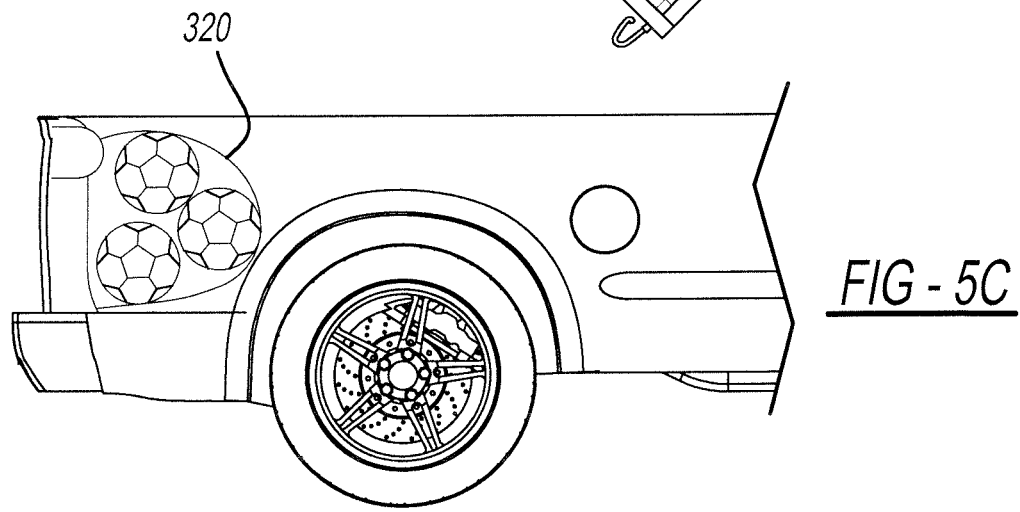

In accordance with an additional embodiment, FIGS. 5A-5C are schematic illustrations of a modular tailgate system shown generally at 310 operably connected to a pickup truck cargo bed shown generally at 312. The modular tailgate system 310 has a tailgate portion shown generally at 314 in combination with a plurality of features. The tailgate portion 314 selectively rotates between a stowed (FIG. 5C) and deployed position (FIG. 5A), e.g., up/down, to allow rear access to the cargo bed. The plurality of features integrated with the tailgate portion include at least one built-in step shown generally at 326 that is operably deployable, e.g., to 90 degrees and/or at a predetermined angle and distance operable to allow an operator to step up onto the tailgate portion 314 and into the cargo bed 312 of the vehicle. By way of example, the built-in step 326 is rotatable, as indicated by arrow "G", to provide at least one stepping surface 328 and to store within a recess formed in the tailgate portion 314 when not in use. The plurality of features further include at least one lighting device 316, e.g., LED light strip, at least one storage unit 318 that is an insulated storage box with at least one compartment and a hinged lid 330, at least one net 320 that is a retractable cargo net, e.g., within a housing, and has a plurality of hooks 319 for connecting to a plurality of loops 321 formed on the tailgate portion interior 314, and at least one power source 332.

It is understood that the modular tailgate system 310 has a tailgate portion 314 in combination with any of at least two predetermined desired plurality of features, including, more or less or alternatives to that shown in FIGS. 5A-5C.

Figure 6:
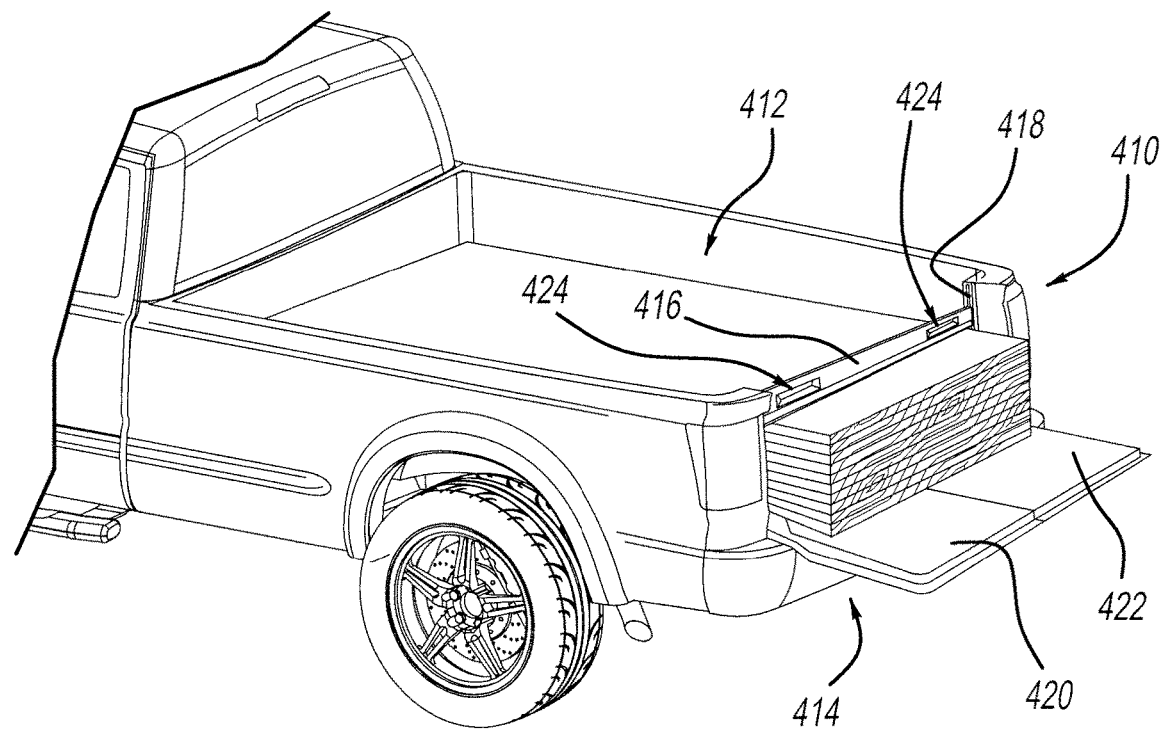
FIG. 6 is a perspective view of a pickup truck bed having a modular tailgate with a tailgate portion in combination with a plurality of features, in accordance with another embodiment of the present invention.

In accordance with another embodiment, FIG. 6 is a modular tailgate system shown generally at 410 operably connected to a pickup truck cargo bed shown generally at 412. The modular tailgate system 410 has a tailgate portion shown generally at 414 in combination with a plurality of features. The tailgate portion 414 selectively rotates between a stowed and deployed position, e.g., up/down, to allow rear access to the cargo bed. The plurality of features integrated with the tailgate portion include a split tailgate door having a first half 420 and a second half 422 that are selectively rotatable individually or separately and/or together between the stowed and deployed positions, and at least one cargo hold bar 416 that is adjustable along a pair of opposing vertical tracks 418 operably coupled to the cargo bed 412 to accommodate cargo loads of various heights. Optionally, by way of non-limiting example, a release mechanism is provided operable to disengage the halves from one another to allow separate movement of the split tailgate door halves. Alternatively, the tailgate is integrally formed as one piece. The cargo hold bar 416 also has at least one operable release mechanism generally shown at 424 that includes a quick grip style clamp latch release.

It is understood that the modular tailgate system 410 has a tailgate portion 414 in combination with any of at least two predetermined desired plurality of features, including, more or alternatives to that shown or described as to FIG. 6.

Figure 7:
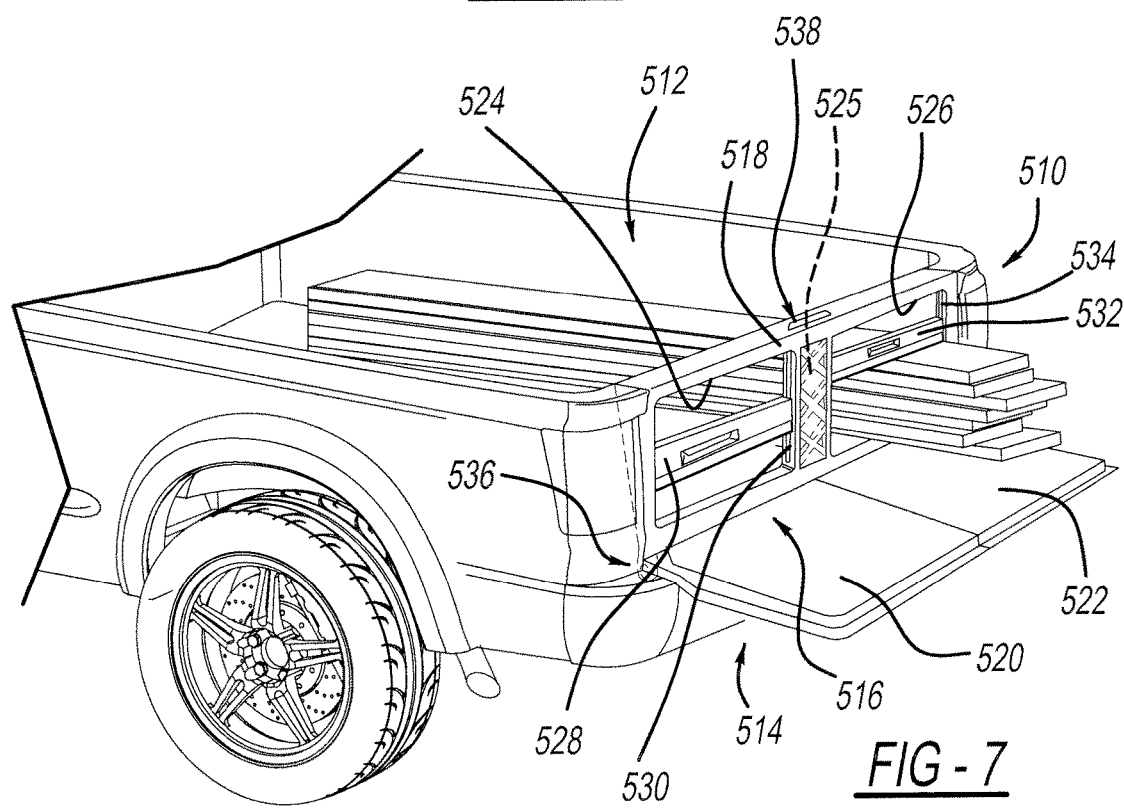
FIG. 7 is a perspective view of a pickup truck bed having a modular tailgate with a tailgate portion in combination with a plurality of features in accordance with yet another embodiment of the present invention.

In accordance with yet another embodiment, FIG. 7 is a modular tailgate system shown generally at 510 operably connected to a pickup truck cargo bed, shown generally at 512. The modular tailgate system 510 has a tailgate portion shown generally at 514 in combination with a plurality of features. The tailgate portion 514 selectively rotates between a stowed and deployed position, e.g., up/down, to allow rear access to the cargo bed. The plurality of features integrated with the tailgate portion include a split tailgate door having a first half 520 and a second half 522 that are selectively rotatable individually or separately and/or together between the stowed and deployed positions, and at least one cargo hold device shown generally at 516 that is adjustable and/or rotatable. There is provided a cargo hold device having a frame 518 with a first opening 524 and a second opening 526. Trusses or a web-like structure or the like shown generally at 525 is integrally formed within at least the middle upstanding portion of the frame 518 between the first and second openings 524,526 for additional strength/support.

A first hold cargo bar 528 is disposed within the first opening 524 and is adjustable along a pair of opposing vertical tracks 530 integrally formed in both sides of the frame 518 or operably connected to the frame 518 to accommodate cargo loads of various heights. A second cargo hold bar 532 is disposed within the second opening 526 and is adjustable (independently from the first cargo bar 528) along a second pair of opposing vertical tracks 534 formed in the frame 518 or operably connected to the frame 518 to accommodate cargo loads of various heights. The first and second cargo hold bars 528 and 532 also each have a release mechanism 538, e.g., that is a quick grip style clamp latch release, operable to allow the hold bars 528 and 532 to selectively adjust vertically along the tracks. Optionally, the release mechanism includes at least one pin and cable which selectively engage the pin within apertures formed in any of the tracks 530,534 at predetermined intervals.

The frame 518 is also operable rotatable from between a stowed and deployed position, e.g., up/down, to allow further rear access to the cargo bed, and uses the same pivot indicated generally at 536 as the tailgate portion 514. The frame 518 has at least one operable release mechanism generally shown at 538, e.g., that includes a quick grip style clamp latch release, to allow rotation of the frame 518.

It is understood that the modular tailgate system 510 has a tailgate portion 514 in combination with any of at least two predetermined desired plurality of features, including, more or alternatives to that shown or described as to FIG. 7.

Figure 8:
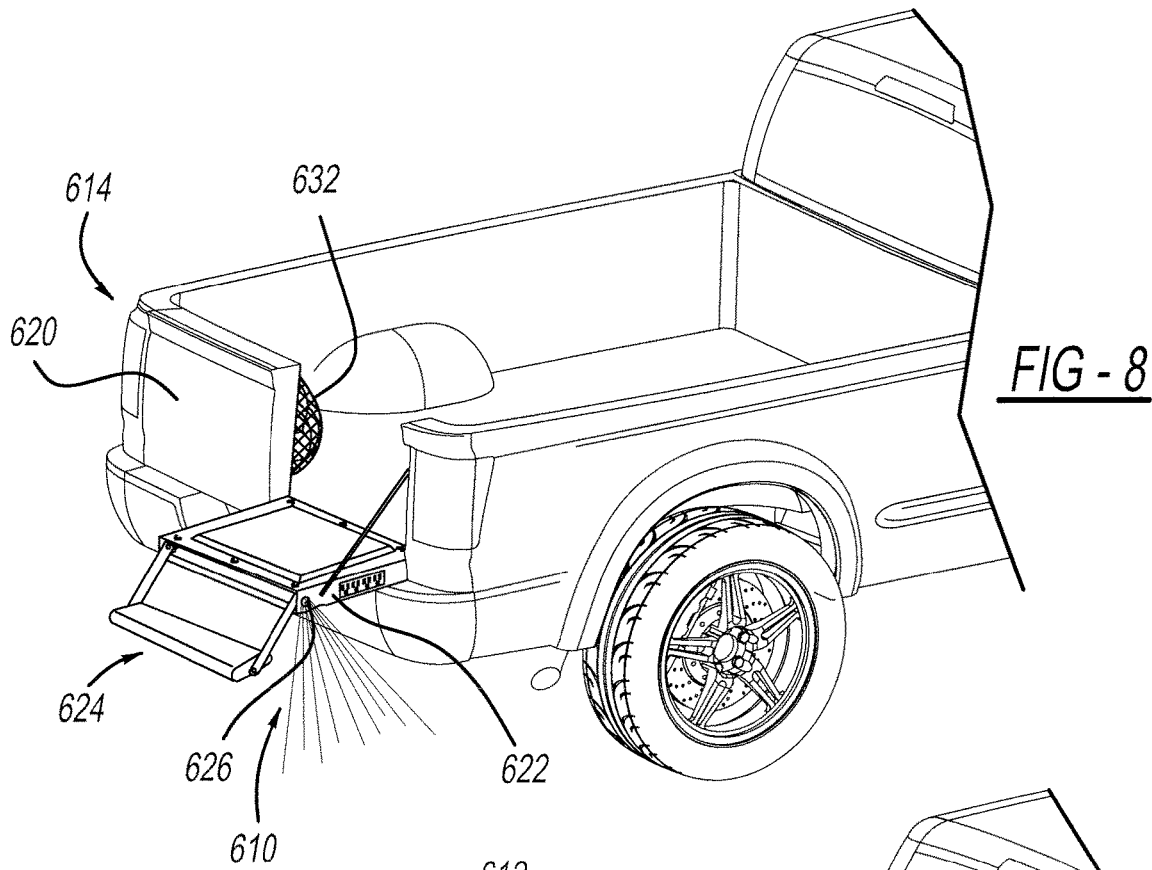
FIG. 8 is a perspective view of a pickup truck bed having a modular tailgate with a tailgate portion in combination with a plurality of features in accordance with yet another embodiment of the present invention.
Figure 9:
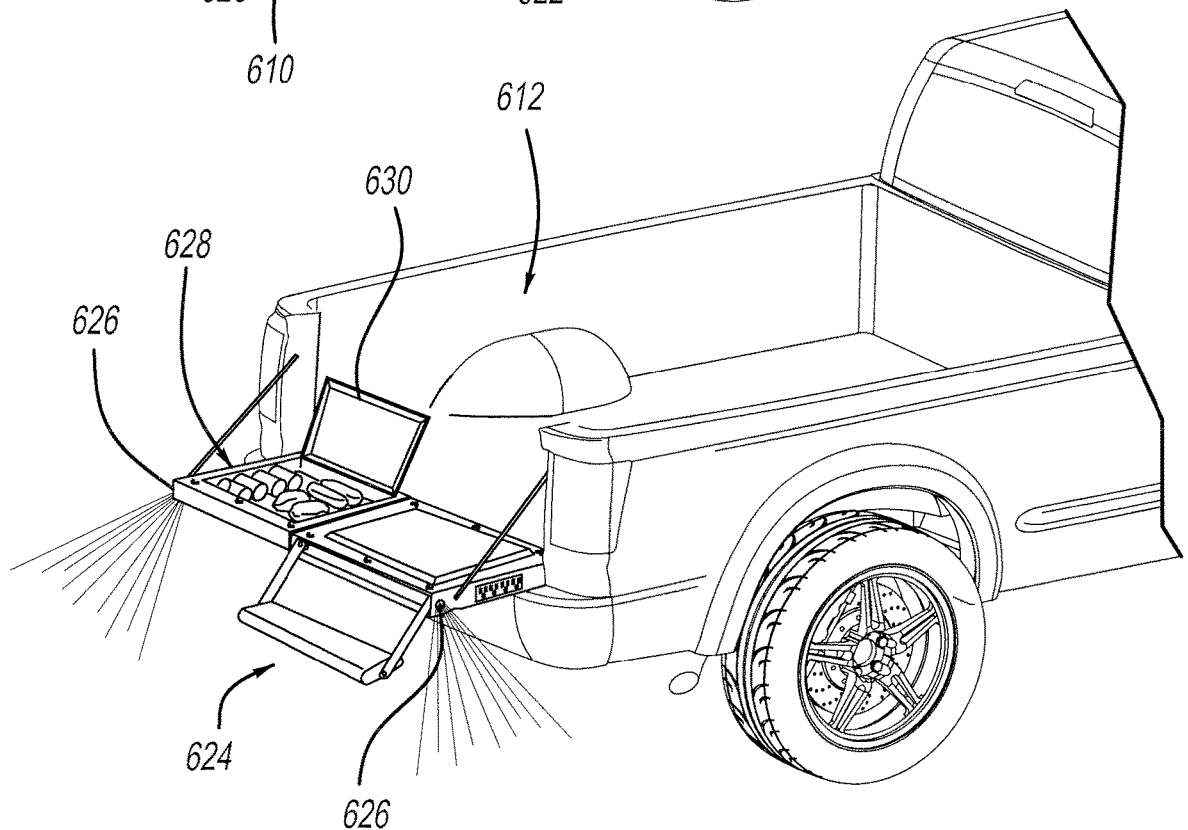
FIG. 9 is a perspective view of a pickup truck bed having a modular tailgate with a tailgate portion in combination with a plurality of features according to the present invention.
Figure 10:
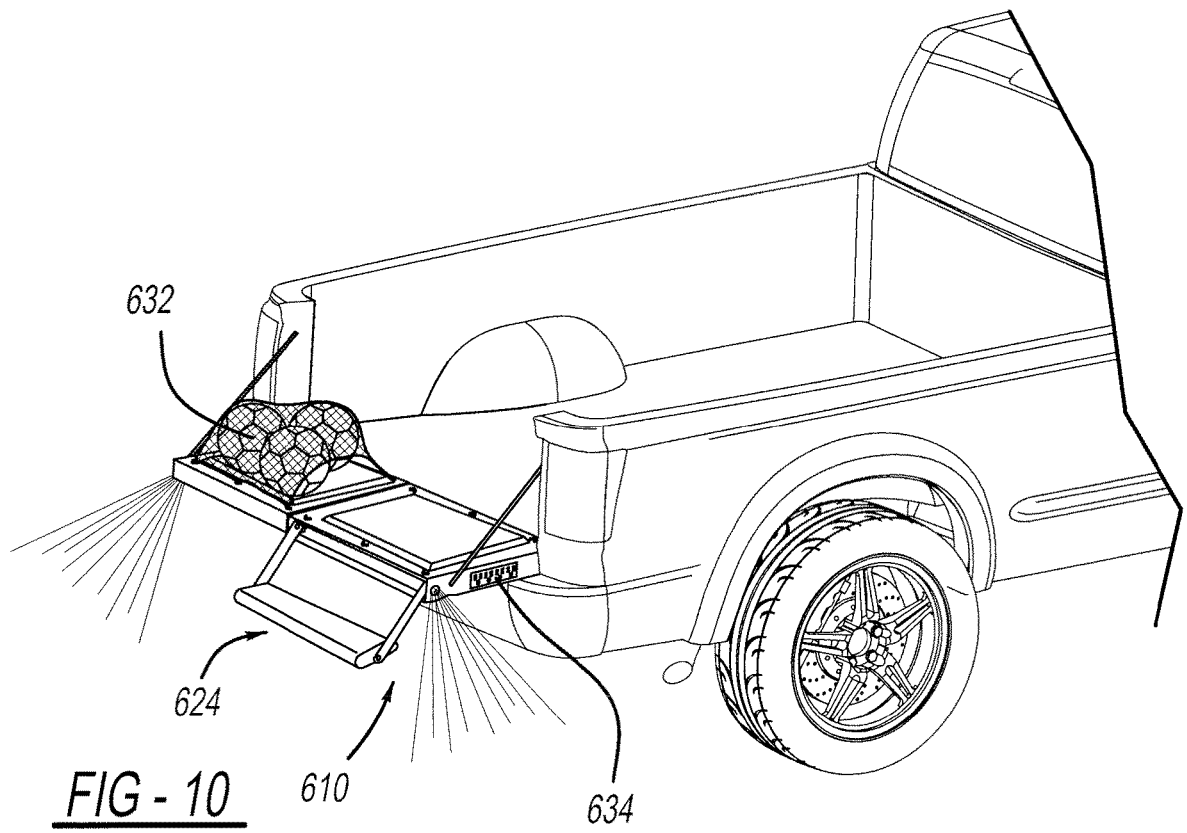
FIG. 10 is a perspective view of a pickup truck bed having a modular tailgate with a tailgate portion in combination with a plurality of features according to the present invention.

In accordance with another embodiment, FIGS. 8-10 illustrate a modular tailgate system shown generally at 610 operably connected to a pickup truck cargo bed shown generally at 612. The modular tailgate system 610 has a tailgate portion shown generally at 614 in combination with a plurality of features. The tailgate portion 614 selectively rotates between a stowed and deployed position, e.g., up/down, to allow rear access to the cargo bed. The plurality of features integrated with the tailgate portion include a split tailgate door having a first half 620 and a second half 622 that are selectively rotatable individually or separately and/or together between the stowed and deployed positions. The plurality of features further includes at least one step, shown generally at 624, operably rotatably coupled to the tailgate portion 614 to allow an operator to step up onto the tailgate portion 614 and/or into the cargo bed 612 of the vehicle. It is understood that the step 624 is foldable or otherwise stowable out of the way when not in use.

The plurality of features further includes at least one lighting source 626, most preferably, at least two lighting devices 626 that illuminate individually and/or in unison, e.g., to light a ground surface in at least one location, most preferably, two locations when the tailgate 614 is in the deployed position. The figures illustrate a lighting device 626 on the upper corners of both door halves 620,622 to illuminate the ground but it is understood alternative and/or additional locations are within the scope of the present invention. At least one power source 634, e.g., strip of a plurality of 12V or higher outlets, is provided on the first half 620 and/or second half 622 of the tailgate.

The plurality of features further includes at least one storage unit shown generally at 628 (e.g., weather sealed cooler) integrated into the first half 620 and/or the second half 622 of the tailgate portion 614, and having a lid 630 which forms an interior side of the tailgate portion 614 when that respective half is in the stowed position.

The plurality of features further includes at least one net 632. By way of non-limiting example, the at least one net 632 can be a retractable cargo net and/or a non-retractable net, and having a plurality of hooks for connecting to a plurality of loops formed on the lid 630 and or tailgate portion interior 614 framework.

It is understood that the modular tailgate system 610 has a tailgate portion 614 in combination with any of at least two predetermined desired plurality of features, including, more or less or alternatives to that shown in FIGS. 8-10.

Figure 11:
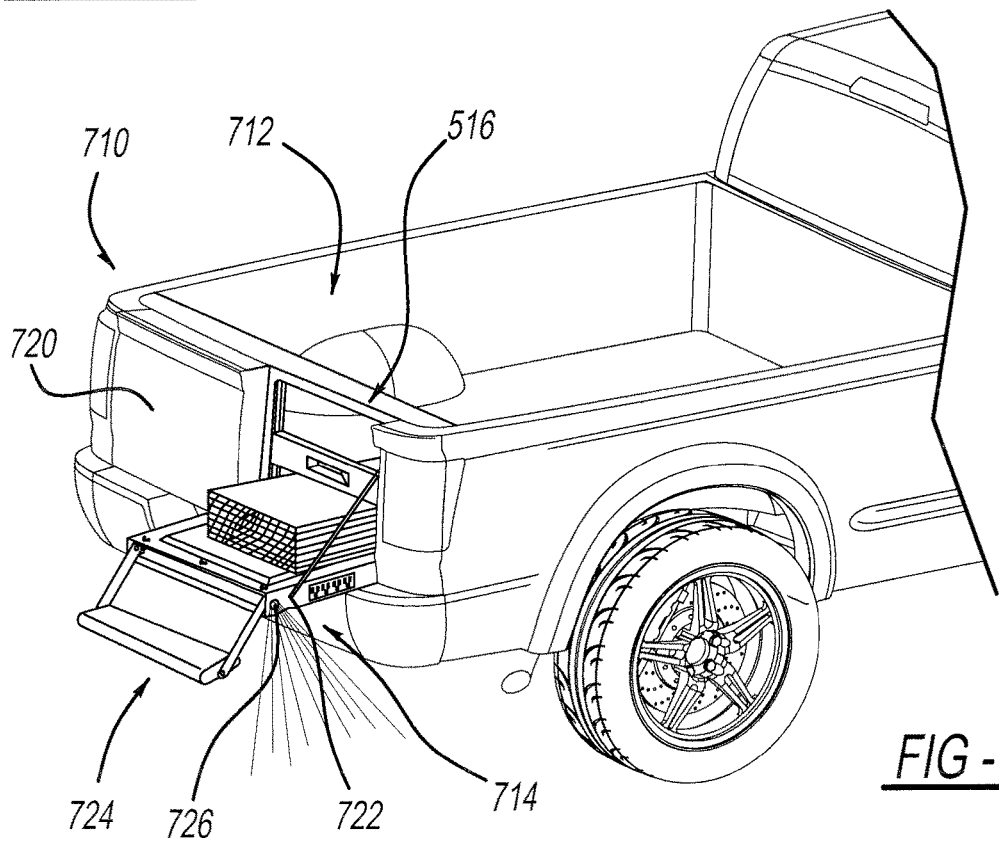
FIG. 11 is a perspective view of a pickup truck with a modular tailgate having a tailgate portion in combination with a plurality of features, in accordance with another embodiment of the present invention.

In accordance with another embodiment, FIG. 11 is a modular tailgate system shown generally at 710 similar to that described and illustrated as to FIG. 7 (e.g., split door tailgate portion and cargo hold device 516 as detailed previously). Alternatively, the cargo hold device 516 has a fixed frame that is not rotatable. The tailgate system 710 is operably connected to a pickup truck cargo bed shown generally at 712. The modular tailgate system 710 has a tailgate portion shown generally at 714 in combination with the plurality of features. The split tailgate door has a first half 720 and a second half 722 that are selectively rotatable individually or separately and/or together between the stowed and deployed positions, as set forth previously. In this embodiment the plurality of features integrated with the tailgate portion further includes at least one step shown generally at 724 operably rotatably coupled to the first half 720 and/or a second half 722 to allow an operator to step up onto the tailgate portion 714 and/or into the cargo bed 712 of the vehicle. The plurality of features further includes least one lighting device 726 or "illumination device", most preferably, at least two lighting devices 726 that illuminate individually and/or separately, e.g., to light a ground surface in at least one location, most preferably, two locations when the tailgate 714, e.g., when either half of the split tailgate portion, is in the deployed position.

It is understood that the modular tailgate system 710 has a tailgate portion 714 in combination with any of at least two predetermined desired plurality of features, including, more or alternatives to that shown or described as to FIG. 11.

Figure 12:
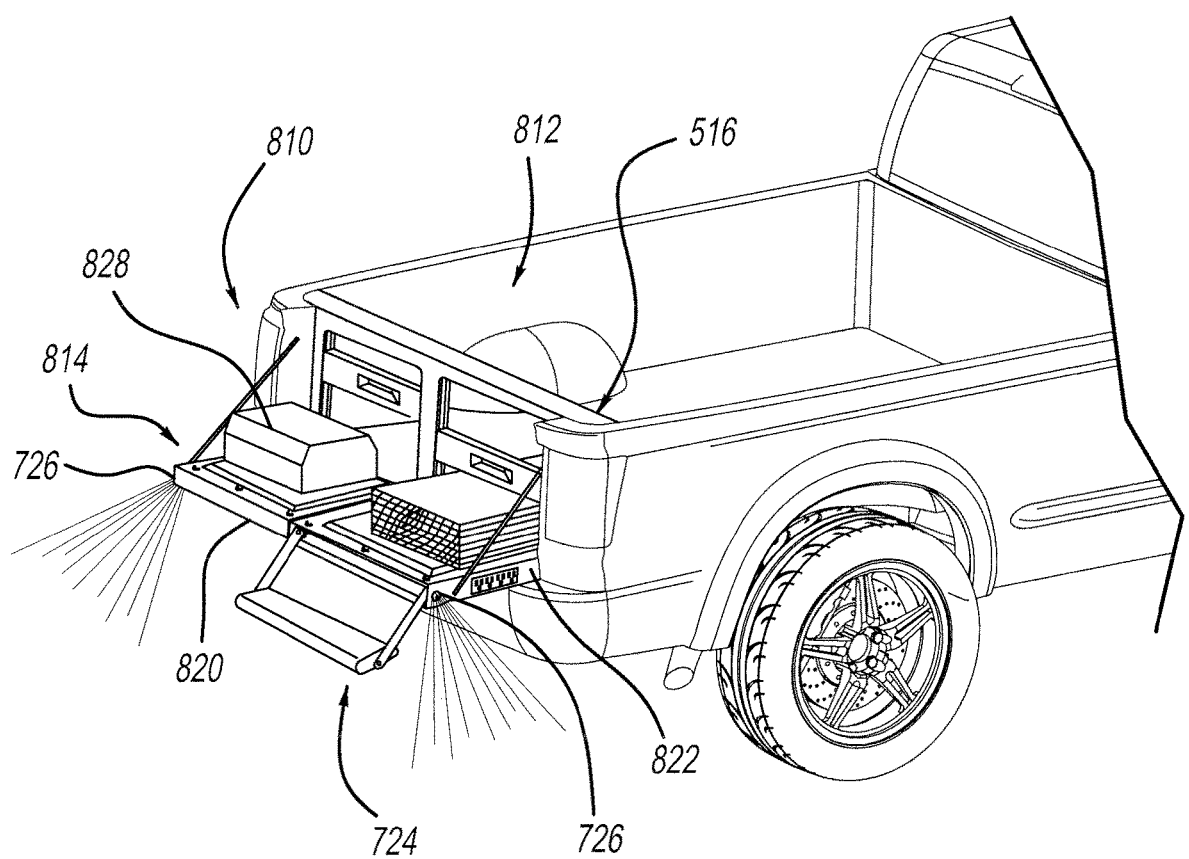
FIG. 12 is a perspective view of a pickup truck with a modular tailgate having a tailgate portion in combination with a plurality of features, in accordance with yet another embodiment of the present invention.

In accordance with another embodiment, FIG. 12 is a modular tailgate system, shown generally at 810, similar to that described and illustrated as to FIGS. 7 and 11 (e.g., a split door tailgate portion and cargo hold device 516 as detailed previously, at least one step 724, and at least one lighting device 726, all as detailed previously). The tailgate system 810 is operably connected to a pickup truck cargo bed shown generally at 812. The modular tailgate system 810 has a tailgate portion shown generally at 814 in combination with the plurality of features. The plurality of features integrated with the tailgate portion further includes at least one storage unit 828, integrated into a first half 820 and/or second half 822 of the tailgate portion 814, and having a lid which at least partially forms an interior side of the tailgate portion 814 when that respective half is in the stowed position.

It is understood that the modular tailgate system 810 has a tailgate portion 814 in combination with any of at least two predetermined desired plurality of features, including, more or alternatives to that shown or described as to FIG. 12.

Figure 13B:
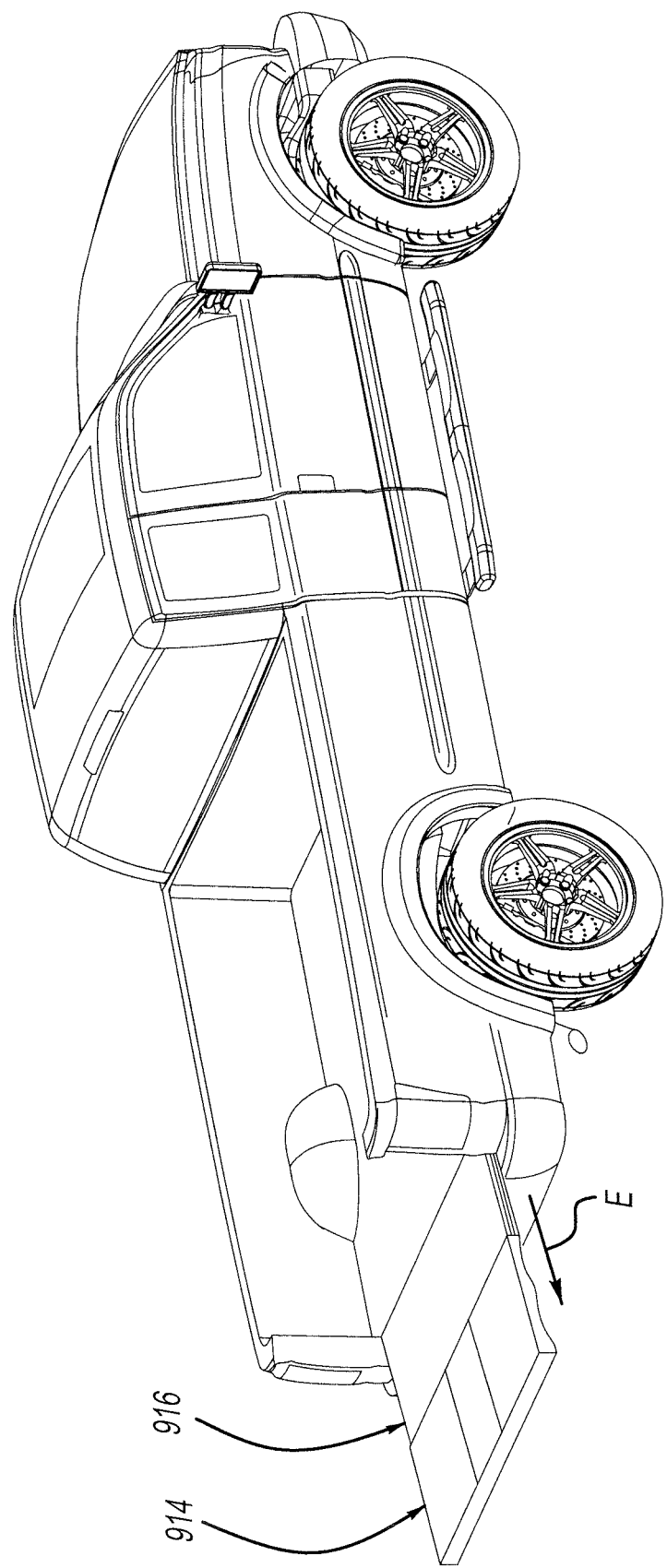
FIG. 13B is a perspective view of the pickup truck with the modular tailgate of FIG. 13A with the modular tailgate in a first extended position according to the present invention.
Figure 13C:
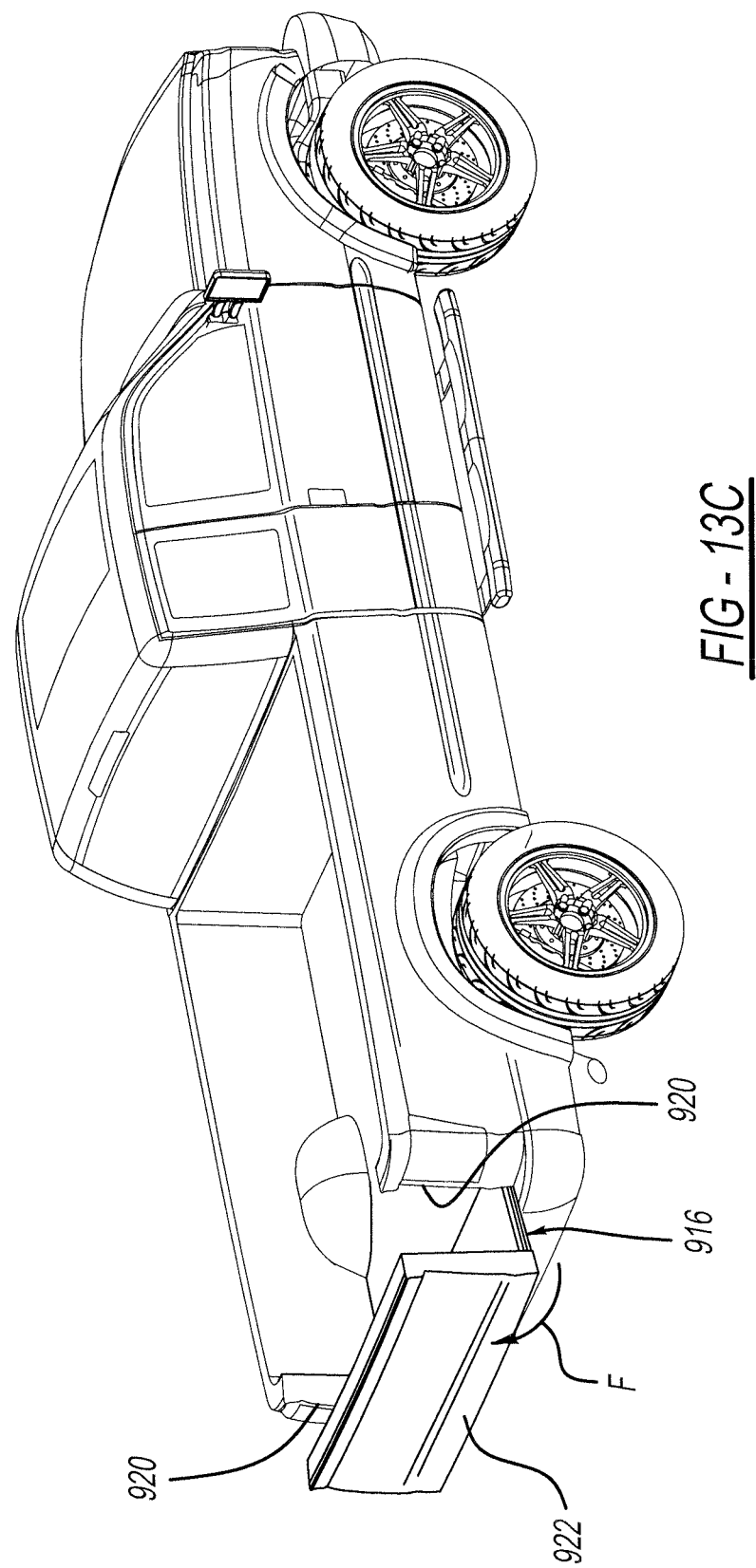
FIG. 13C is a perspective view of the pickup truck with the modular tailgate of FIGS. 13A-B with the modular tailgate in a second extended position according to the present invention.
Figure 13D:
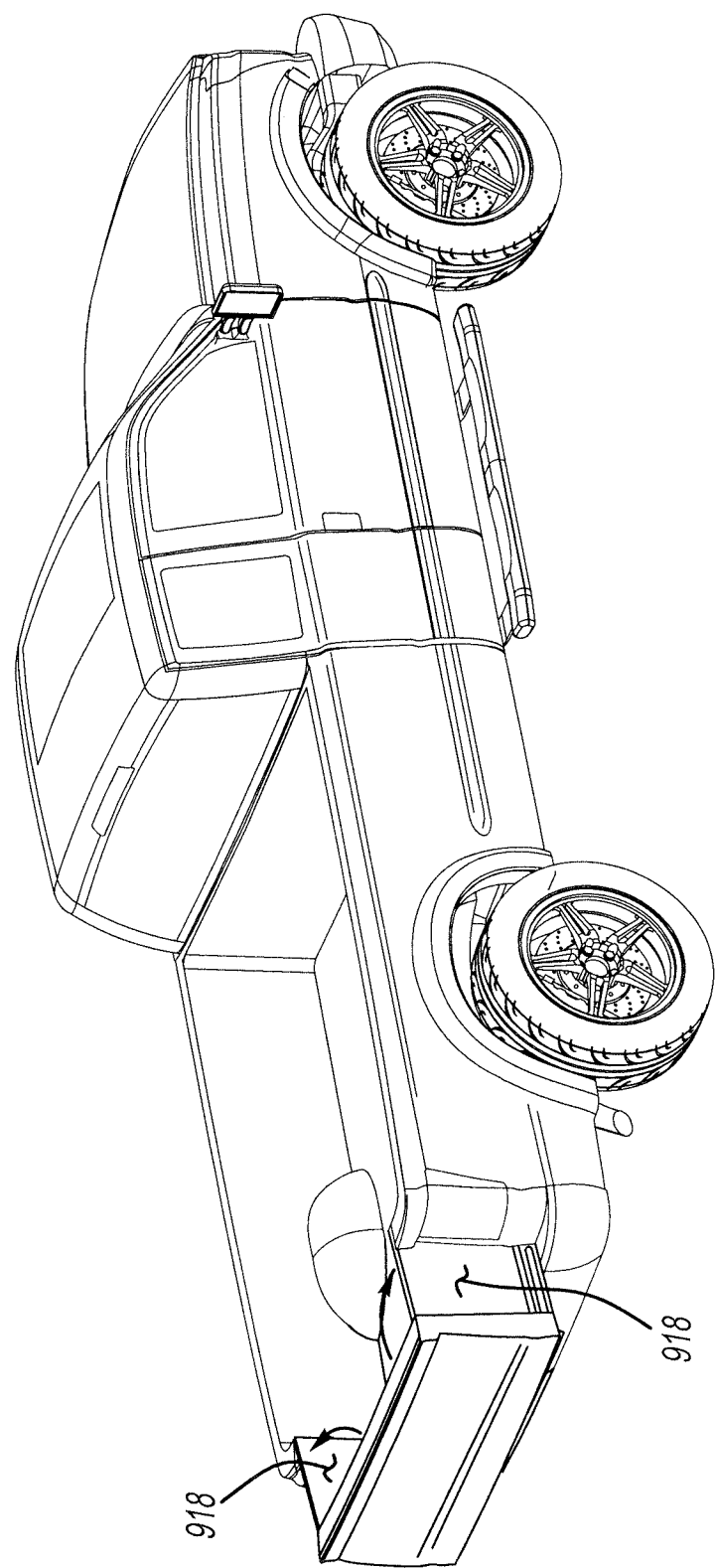
FIG. 13D is a perspective view of the pickup truck with the modular tailgate of FIG. 13A-C with the modular tailgate in a third extended position with side doors according to the present invention.

In accordance with yet another embodiment, FIGS. 13A-13D illustrate a modular tailgate system shown generally at 910 operably connected to a pickup truck cargo bed shown generally at 912. The modular tailgate system 910 has a tailgate portion shown generally at 914 in combination with a plurality of features. The tailgate portion 914 selectively rotates between a stowed and deployed position, e.g., up/down, to allow rear access to the cargo bed and at least one intermediate position. The plurality of features integrated with the tailgate portion include at least one bed extension system shown generally at 916 operably connected to the operably slidably connected to the cargo bed 912 and/or vehicle frame. The bed extension system 916 is selectively slid, as indicated by arrow "E" rearward to extend the length of the cargo bed 912 a predetermined amount to an extended position (FIG. 13B). The tailgate portion 914 is also selectively rotatable, as indicated by arrow "F", to a second stowed position when the bed is in the extended position. By way of non-limiting example, the tailgate 922 is hinged to the extension portion 916 to allow rotation "F" to the second stowed position (FIG. 13C). The plurality of features integrated with the tailgate portion further include at least on rotatable door 918, preferably at least two opposing doors 918, operably connected to the tailgate portion 914. The rotatable doors 918 are selectively inwardly rotatable (FIG. 13D) to form side walls operably closing off opposing pairs of openings 920 after the bed extension 916 is extended.

It is understood that the modular tailgate system 910 has a tailgate portion 914 in combination with any of at least two predetermined desired plurality of features, including, more or less or alternatives to that shown in FIGS. 13A-13D.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular tailgate system, comprising:
   a tailgate portion operably connected to a cargo bed area and rotatable between a stowed position and at least one deployed position; and
   a plurality of features incorporated with the tailgate portion and employable with existing vehicles without any hardware or mounting modifications to existing body sides and/or existing cargo beds, wherein the plurality of features are selected from the group consisting of a three-way opening door, at least one storage unit, at least one step, at least one lighting device, at least one bed extension system, at least one power source, at least one tie down, at least one net, at least one cargo hold system, at least one sawhorse, at least one bench, at least one seat, and combinations thereof;
   wherein at least one of the plurality of features is selected from the group consisting of at least one integrated step that is slidably or rotatably extendable to provide at least one stepping surface, the at least one storage unit, the at least one lighting device, at least one power outlet and combinations thereof; and
   wherein at least one of said plurality of features is the integrated step, wherein the integrated step is slidable to an extended position at a predetermined angle and includes a notched stepping surface providing an angled stepping surface into the cargo bed.

2. The modular tailgate system of claim 1, wherein the modular tailgate system includes the tailgate portion in combination with at least three of the plurality of features.

3. The modular tailgate system of claim 1, wherein at least one of the plurality of features is selected from the group consisting of the at least one storage unit, a multi-way opening tailgate portion that swings outward or pivots downward to the at least one deployed position, at least one integrated tie-down, the at least one lighting device and combinations thereof.

4. The modular tailgate system of claim 3, wherein the at least one lighting device is a pivotable lighting source with light emitting diodes.

5. The modular tailgate system of claim 1, wherein the integrated step has an upper portion operably connected to a lower depending step portion and provides a stepping surface into the cargo bed.

6. The modular tailgate system of claim 1, wherein the at least one lighting device is a ground illumination light emitting diode, the at least one power source is a multi-outlet strip, and the at least one storage unit is a weather sealed cooler.

7. The modular tailgate system of claim 1, wherein at least one of the plurality of features is selected from the group consisting of at least one lighting device that is a light emitting diode lighting strip; at least one other lighting source, the at least one net, at least one storage compartment and combinations thereof.

8. The modular tailgate system of claim 7, wherein the at least one integrated step is hinged in at least one location to move the step between a stowed and an extended position.

9. The modular tailgate system of claim 1, wherein at least one of the plurality of features is selected from the group consisting of at least one lighting device that is a light emitting diode lighting strip, the at least one power source, the at least one net, at least one storage compartment and combinations thereof.

\* \* \* \* \*